(12) United States Patent
Schmidt et al.

(10) Patent No.: US 8,213,651 B2
(45) Date of Patent: Jul. 3, 2012

(54) HEARING DEVICE WITH A CONTACT UNIT AND AN ASSOCIATED EXTERNAL UNIT

(75) Inventors: Benjamin Schmidt, Nürnberg (DE); Roland Weigert, Erlangen (DE)

(73) Assignee: Siemens Medical Instruments Pte. Ltd., Singapore (SG)

( * ) Notice: Subject to any disclaimer, the term of this patent is extended or adjusted under 35 U.S.C. 154(b) by 943 days.

(21) Appl. No.: 12/229,757

(22) Filed: Aug. 26, 2008

(65) Prior Publication Data

US 2009/0067652 A1    Mar. 12, 2009

(30) Foreign Application Priority Data

Sep. 6, 2007 (DE) .......................... 10 2007 042 324

(51) Int. Cl.
*H04R 25/00* (2006.01)

(52) U.S. Cl. ....... 381/314; 381/23.1; 381/322; 381/324; 381/325; 381/328

(58) Field of Classification Search ................. 381/23.1, 381/314, 322–325

See application file for complete search history.

(56) References Cited

U.S. PATENT DOCUMENTS

| | | | | | |
|---|---|---|---|---|---|
| 1,630,028 | A | * | 5/1927 | Reynolds | 381/328 |
| 3,701,862 | A | * | 10/1972 | Vignini | 429/97 |
| 4,186,335 | A | * | 1/1980 | Cahill | 320/103 |
| 4,329,676 | A | * | 5/1982 | McDonald et al. | 338/198 |
| 4,379,988 | A | * | 4/1983 | Mattatall | 320/108 |
| 4,739,512 | A | * | 4/1988 | Hartl et al. | 381/328 |
| 4,783,816 | A | * | 11/1988 | Buttner et al. | 381/330 |
| 4,947,439 | A | * | 8/1990 | Buettner | 381/323 |
| 4,955,729 | A | * | 9/1990 | Marx | 381/322 |
| 5,244,343 | A | * | 9/1993 | Lockert | 414/797 |
| 5,253,300 | A | * | 10/1993 | Knapp | 381/323 |
| 5,386,476 | A | * | 1/1995 | Bisgaard et al. | 381/323 |
| 5,500,901 | A | * | 3/1996 | Geraci et al. | 381/323 |
| 5,610,494 | A | * | 3/1997 | Grosfilley | 320/113 |
| 5,754,124 | A | * | 5/1998 | Daggett et al. | 340/908.1 |
| 5,812,680 | A | * | 9/1998 | Glendon | 381/322 |
| 5,855,692 | A | * | 1/1999 | Kaji et al. | 136/245 |
| 6,777,910 | B2 | * | 8/2004 | Small | 320/106 |
| 6,831,988 | B2 | * | 12/2004 | Vonlanthen | 381/323 |
| 7,062,057 | B2 | * | 6/2006 | Wu | 381/323 |
| 7,142,682 | B2 | * | 11/2006 | Mullenborn et al. | 381/322 |
| 7,206,429 | B1 | * | 4/2007 | Vossler | 381/381 |
| 7,215,789 | B2 | * | 5/2007 | Shennib et al. | 381/328 |
| 7,508,949 | B2 | * | 3/2009 | Neilson | 381/314 |
| 7,536,023 | B2 | * | 5/2009 | Leedom et al. | 381/322 |
| 7,602,929 | B2 | * | 10/2009 | Topholm et al. | 381/322 |
| 7,684,580 | B2 | * | 3/2010 | Menzl | 381/328 |

(Continued)

FOREIGN PATENT DOCUMENTS

DE        41 04 359 C2    8/1992

(Continued)

*Primary Examiner* — Eugene Lee
*Assistant Examiner* — Mohammed Shamsuzzaman

(57) ABSTRACT

The invention specifies a hearing device, which has at least one contact means which can be flush with the hearing device housing. The contact means contacts an external unit, for instance a battery charging unit, when in an extended or folded-out position. The unit has a corresponding opening for receiving the contact means. As a result, a reliable connection can be established between the hearing device and the charging device when charging a rechargeable battery of the hearing device for instance. The contact means can comprise first and second contact elements, and third contact elements which correspond to the external unit.

18 Claims, 6 Drawing Sheets

U.S. PATENT DOCUMENTS

| | | | |
|---|---|---|---|
| 7,735,996 B2 * | 6/2010 | van der Zwan et al. | 351/158 |
| 7,822,215 B2 * | 10/2010 | Carazo et al. | 381/151 |
| 2003/0156727 A1 * | 8/2003 | Vonlanthen | 381/330 |
| 2004/0081328 A1 * | 4/2004 | Leedom et al. | 381/312 |
| 2004/0120539 A1 * | 6/2004 | Panitzsch | 381/312 |
| 2005/0147268 A1 * | 7/2005 | Peng | 381/333 |
| 2005/0286732 A1 * | 12/2005 | Linkenkaer-Hansen | 381/322 |
| 2006/0034474 A1 * | 2/2006 | Topholm et al. | 381/322 |
| 2006/0050919 A1 * | 3/2006 | Castro et al. | 381/386 |
| 2006/0260145 A1 * | 11/2006 | Wang | 33/414 |
| 2008/0118093 A1 * | 5/2008 | Klemenz et al. | 381/324 |
| 2008/0136369 A1 * | 6/2008 | Klemenz et al. | 320/107 |
| 2008/0166007 A1 * | 7/2008 | Hankey et al. | 381/380 |
| 2009/0279727 A1 * | 11/2009 | Brimhall et al. | 381/323 |
| 2010/0215204 A1 * | 8/2010 | Castro et al. | 381/386 |

FOREIGN PATENT DOCUMENTS

| | | |
|---|---|---|
| DE | 10 2006 052 713 A1 | 5/2008 |
| GB | 2282715 A | 4/1995 |
| WO | 03067734 A2 | 8/2003 |
| WO | 2008118478 A1 | 10/2008 |

* cited by examiner

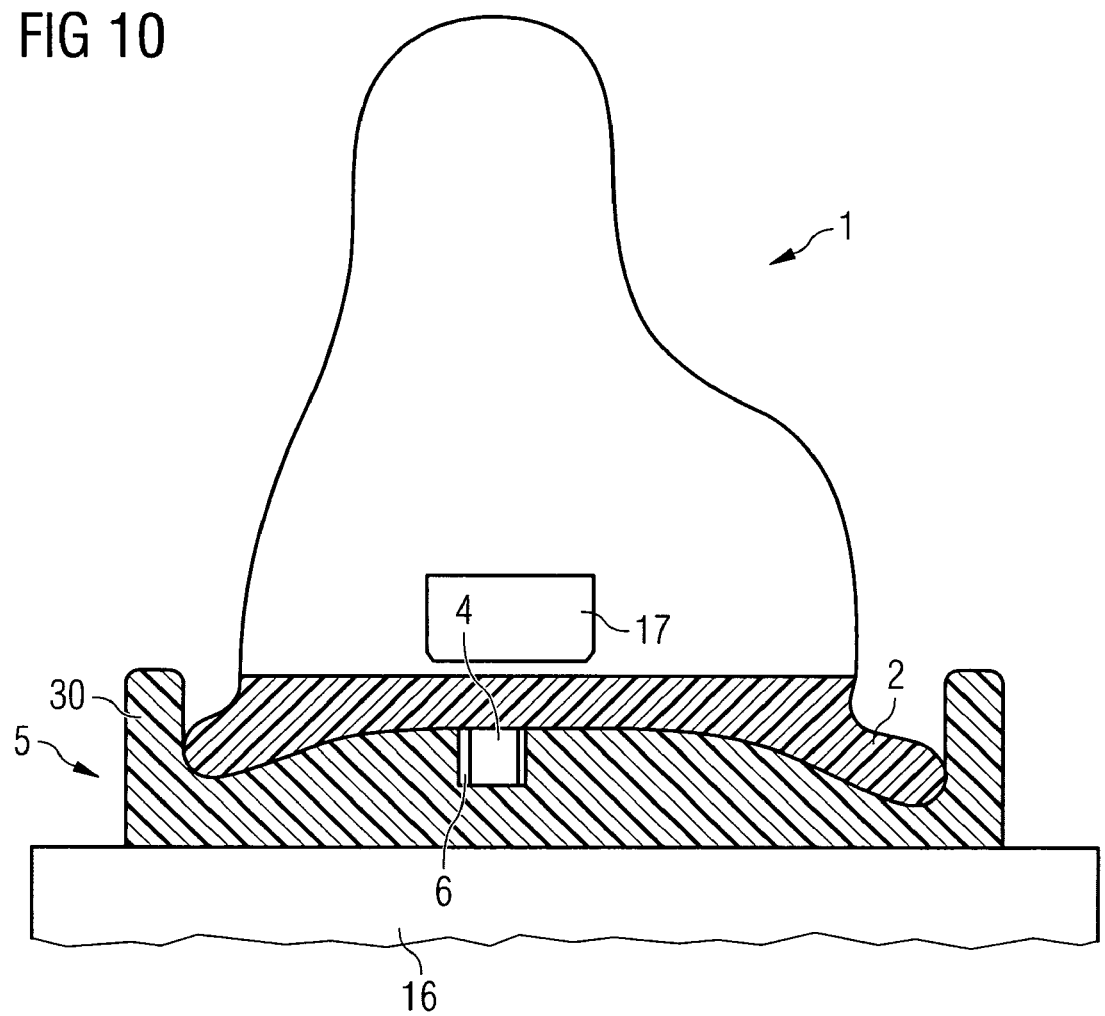

HEARING DEVICE WITH A CONTACT UNIT AND AN ASSOCIATED EXTERNAL UNIT

CROSS REFERENCE TO RELATED APPLICATIONS

This application claims priority of German application No. 10 2007 042 324.3 filed Sep. 6, 2007, which is incorporated by reference herein in its entirety.

FIELD OF THE INVENTION

The invention relates to a hearing device and an external unit associated therewith.

BACKGROUND OF THE INVENTION

Hearing devices must establish contact with an external unit for different applications. By way of example, hearing devices require an energy source for powering the electrical components during their operation. Hearing devices are thus generally provided with batteries. To avoid a time-consuming and costly replacement of the batteries, rechargeable batteries are often used. For charging purposes, these are either removed from the hearing device and connected to a battery charging station or the batteries remain in the hearing device and are linked to a battery charging station by way of charging contacts integrated in the housing.

Particularly with an in-the-ear hearing device, the housing of which is individually molded according to the shape of the auditory canal of the hearing device wearer, a positioning of charging contacts for secure connection to a standardized battery charging station may be difficult.

A known solution thus consists in using an inductive battery charging method, with which a coil arranged in the hearing device takes up the electrical energy emitted by a coil of the charging device in a contact-free fashion and forwards it to the battery. One example of an inductive charging system for hearing aids is specified in the patent application DE 41 04 359 C2.

The inductive charging apparatus is disadvantageous in respect of the low degree of efficiency and the large space-wasting charging coil inside the hearing device.

SUMMARY OF THE INVENTION

It is the object of the invention to overcome these disadvantages and to specify a hearing device, which can be reliably and simply contacted with an external unit.

According to the invention, the set object is achieved with the arrangement of the first independent claim, by the hearing device including at least one contact means which can be flush with the hearing device housing. This can be extended or folded out and in its extended or folded-out position can be contacted with an external unit, a battery charging device for instance.

This is advantageous in that a defined, reliable contact can be established.

In one development, the hearing device can be embodied such that the contact means can be inserted into the external unit.

The advantageous factor here is that the contacting is robust and stable.

In a further embodiment, the contact means can be a first contact element or a first and a second contact element.

As a result, electrical signals and electrical currents can be transmitted between an external unit and the hearing device.

In one development, the contact means for the mechanical connection with the external unit can comprise a first magnetic element, for instance on its tip.

This is advantageous in that a robust mechanical connection can be established between the external unit and the hearing device.

A further object of the invention consists in specifying an external unit which corresponds to the hearing device according to the invention.

According to the invention, the set object is achieved with the apparatus of the second independent claim, by an external unit having an opening which corresponds to the contact means. This opening receives the contact means. The hearing device is almost 'docked' on the external unit.

As a result, the contact means easily locates the position which is required for contacting purposes.

In a further embodiment, the opening can be configured such that during insertion, the contact means can be guided into the opening from the lateral limitations of the opening.

It is advantageous here that a snug fitting and thus reliable insertion and contacting is possible as a result.

In one development, at least one third contact element can be arranged in the opening, said third contact element establishing an active connection with the first and/or second contact element.

As a result, electrical signals can be transmitted for instance.

In one development, the third contact element can include a first spring element, with the aid of which the contact element can be stored in the opening in an elastic fashion.

This has the advantage of improved contacting between the contact elements of the hearing device and those of the external unit.

In a further embodiment, a second magnetic element can be arranged on the base of the opening. This assumes an active connection together with the first magnetic element.

As a result, the contact means is held in a fixed but nevertheless removable fashion in the opening.

In one development, the second magnetic element has a second spring element, with the aid of which the second magnetic element can be stored in the opening in an elastic fashion.

This optimizes the hold of the contact element in the opening.

In one development, the opening can be embodied as a tapped blind hole.

This can be manufactured in a simple and precise fashion.

According to the invention, a rechargeable battery which is arranged in the inventive hearing device is connected to the contact means and the inventive external unit includes an electrical battery charging device.

This is advantageous in that even with in-the-ear hearing devices, a rechargeable battery can be easily and reliably recharged without having to remove it from the hearing device.

BRIEF DESCRIPTION OF THE DRAWINGS

Further details of the invention are apparent from the descriptions of several exemplary embodiments below, with reference to schematic drawings, in which:

FIG. 10: shows a part of a battery charging arrangement with hearing device.

DETAILED DESCRIPTION OF THE INVENTION

Figure 1:
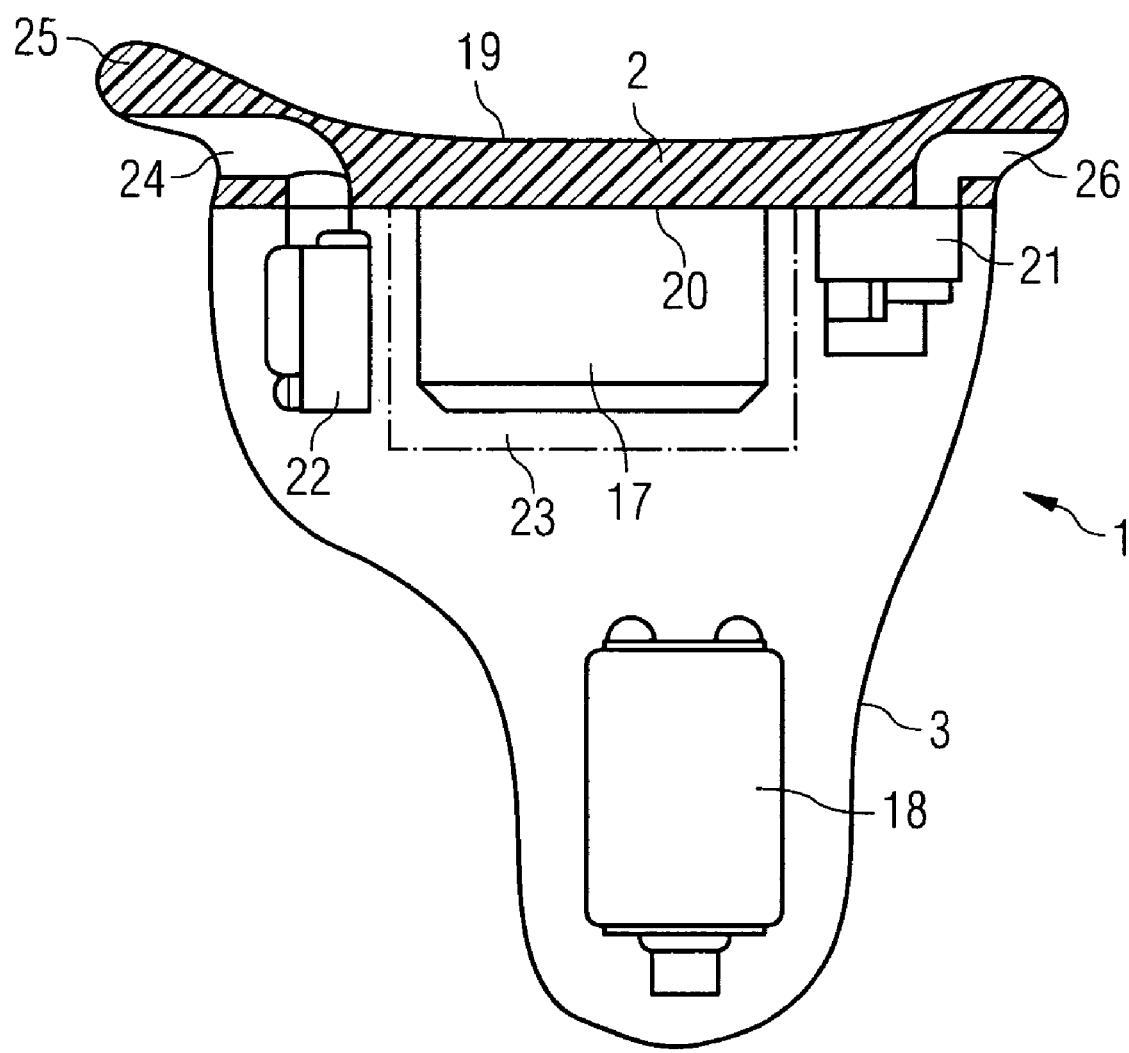
FIG. 1: shows an in-the-ear hearing device.

FIG. 1 shows a section through an in-the-ear hearing device 1 with a housing shell 3 which has been individually manufactured by means of an ear impression, in the proximal inner housing section of which a receiver 18 is arranged and with a front face 2 being attached to the flat front of the distal bulging front part of the shell 3.

The front face 2 is a preferably prefabricated press or injection-molded plastic part. The visible surface 19 of the front face 2 generally neither has apertures, boreholes, openings, components or suchlike. In accordance with the invention, the visible surface 19 nevertheless has an aperture (not shown) for receiving a contact means 4. During adjustment to the characteristics of the human concha, the visible surface 19 of the front face 2 is molded to be concave and/or has a contour formed to match the human ear mold.

The front face 2 is assembled on the housing interior 20 which faces away from the visible surface 19 with hearing device components 21, 22, 23 and forms a functional unit herewith. In the exemplary embodiment, the front face 2 on the housing side supports a microphone 22, an amplifying unit 21 and a battery compartment 23 with a rechargeable battery 17. A sound inlet opening arranged in the border area 25 of the front face 2 is designated with 24, through which sound inlet opening the acoustic signals are able to reach the assigned microphone 22. In the instance that the hearing device 1 is also to include a vent channel for ventilating and for equalizing the pressure in the auditory canal, the vent opening 26 is likewise arranged in the border area 25 of the front face 2.

Figure 2A:
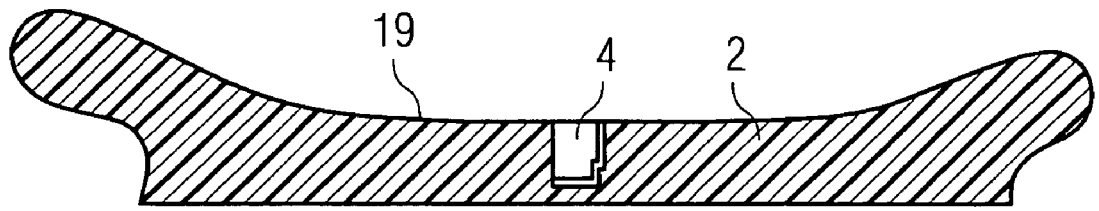
FIG. 2*a*: shows a retracted contact means.

FIG. 2a shows a section through the front face 2 of an in-the-ear hearing device. In accordance with the invention, a contact means 4 which is flush with the front face 2 is arranged in the front face 2 as viewed from the visible surface 19. Applying pressure to the contact means 4 allows this to be extended out of the front face 2. For countersinking purposes, the contact means 4 is pressed into the front face 2 and is then held in a stop position.

Figure 2B:
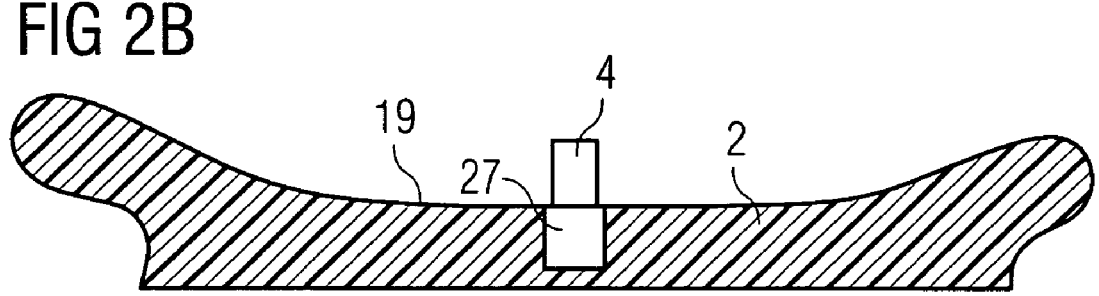
FIG. 2*b*: shows an extended contact means.

FIG. 2b shows the arrangement of FIG. 2a when the contact means 4 is in the extended position. Applying pressure to the contact means 4 causes said contact means to pop out of the visible surface 19 of the front face 2 of the hearing device 1 and leaves an opening 27 behind in the front face 2.

Figure 3A:
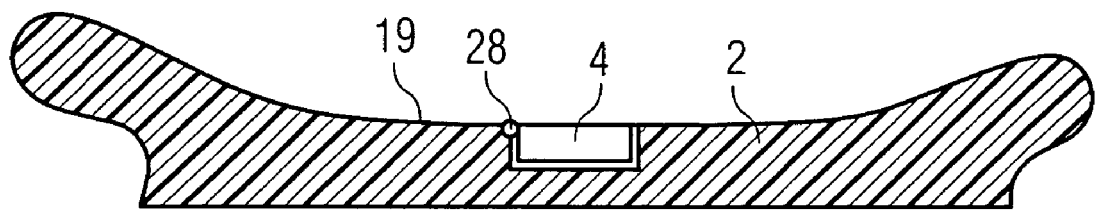
FIG. 3*a*: shows a folded-in contact means.

FIG. 3a shows a section through a further embodiment of a face plate 2 of an inventive hearing device 1. In this way, the contact means 4 is arranged in a foldable fashion and is shown in FIG. 3a in a folded-in position. The contact means 4 is rotatably mounted about a hinge axis 28 and can be easily swung open by means of spring elements (not shown) by applying pressure to the contact means 4.

Figure 3B:
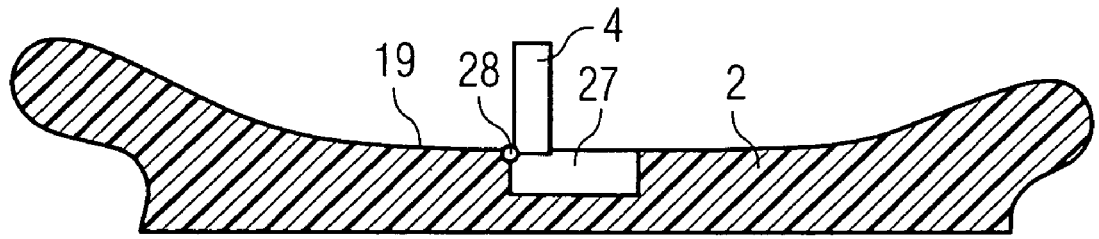
FIG. 3*b*: shows a folded-out contact means.

FIG. 3b shows the folded-out position of the contact means 4 from FIG. 3a. The contact means 4 is swiveled out of the visible surface 19 of the front face 2 about the hinge axis 28. The folded-out contact means 4 leaves an opening 27 behind in the visible surface 19.

Figure 4:
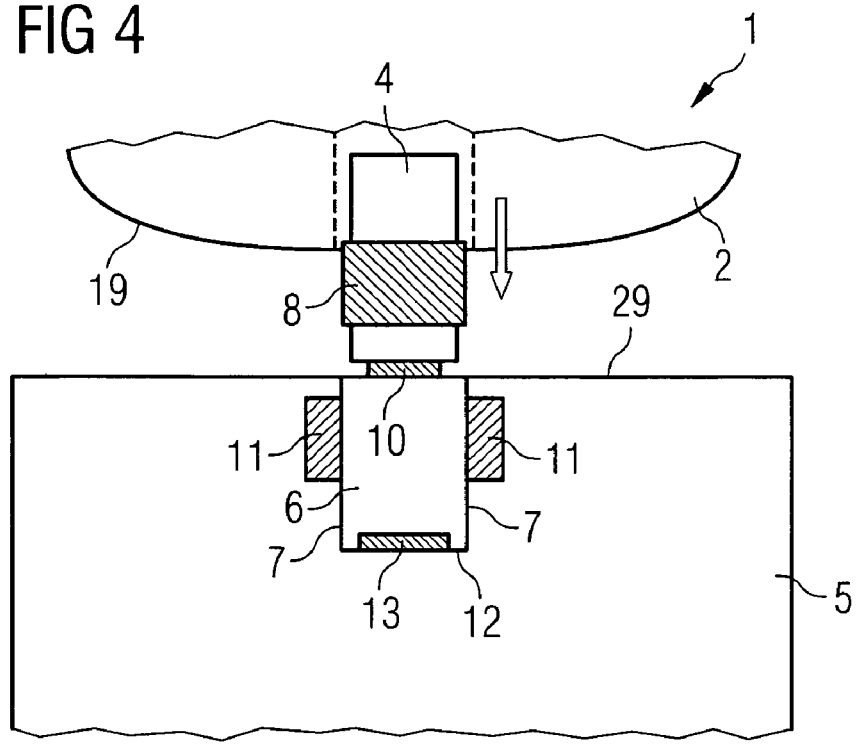
FIG. 4: shows a partial view of a hearing device and an external unit.

FIG. 4 shows a partial view of a section through an inventive in-the-ear hearing device 1 and an external unit 5, for instance a battery charging device. The front face 2 of the hearing device 1 includes an extendable cylindrical contact means 4 in the form of a pushbutton, which is indicated in the extended position. The contact means 4 fits into an opening 6, in a form-fit fashion, for instance a tapped blind hole of an external unit 5. In the inserted state, a first contact element 8, which is arranged in the manner of a cylinder on the exterior of the contact means 4, contacts a third contact element 11 which is arranged in the manner of a cylinder on the interior 7 of the opening 6. An electrical low-resistance connection is thus established for instance, by way of which a battery of the hearing device (not shown) can be charged for instance.

A first magnetic element 10 is arranged on the tip of the contact means 4 and a corresponding second magnetic element 13 on the base 12 of the opening 6 in order to improve the mechanical connection between the hearing device 1 and external unit 5 in the docked state and in order to stabilize this connection. These form a force-fit but in turn detachable connection.

A second contact element 9 (not shown) forms the second pole of the electrical connection. The second contact element 9 can either be arranged on the visible surface 19 of the front face 2 or however like the first contact element 8 on the contact means 4. Correspondingly, additional third contact means (not shown) are then arranged for instance in a ring-shaped fashion on the front side 29 of the external unit 5 or for instance in the manner of a cylinder in the opening 6.

Figure 5:
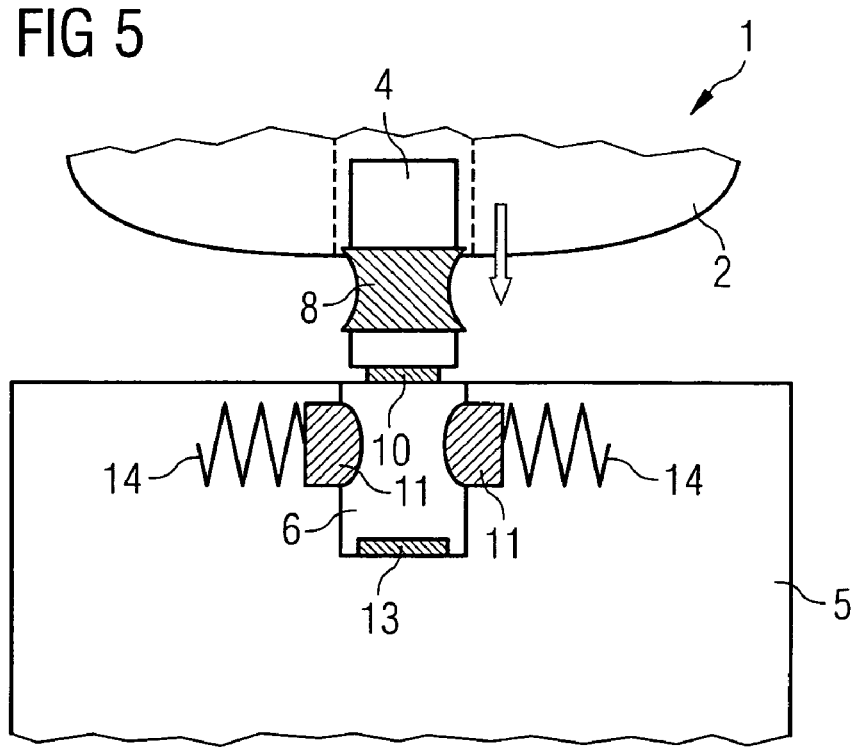
FIG. 5: shows a partial view of an additional hearing device and an additional external unit.

One development of the arrangement from FIG. 4 is shown in FIG. 5. A part of the contact means 4, upon which a first contact element 8 is arranged, shows a convex form. This convex contact means 4 corresponds ideally to the concavely formed third contact elements 11 in the opening 6 of the external unit 5. Spring elements 14 below the third contact elements 11 additionally provide for an improved contacting with the first contact element 8 as well as an amplified docking of the hearing device 1 to the external unit 5. The docking force is also increased by the magnetic elements 10, 13 described in FIG. 4.

Figure 6:
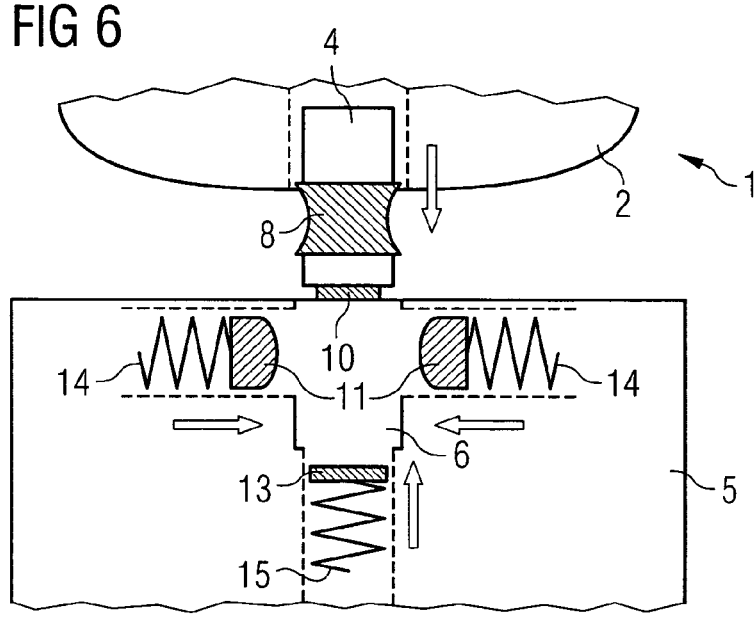
FIG. 6: shows a partial view of an additional hearing device and an additional external unit.

FIG. 6 shows a development of the arrangement from FIG. 5, with, in addition to the elastic mounting of the third contact elements 11, the second magnetic element 13 likewise being mounted in an elastic fashion by means of a second spring element 15.

Figure 7A:
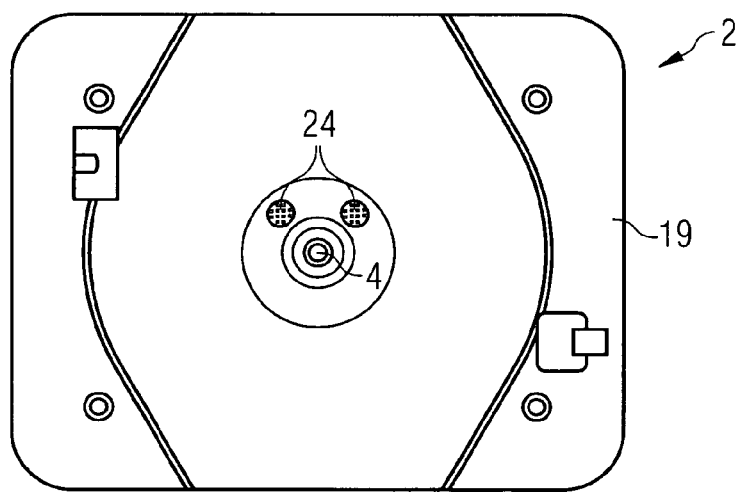
FIG. 7a: shows a front face with contact means.

FIG. 7a shows a significantly enlarged visible surface 19 of a front face 2 of an in-the-ear hearing device 1 having two microphone openings 24 and a retracted contact means 4 arranged centrally therein. A housing shell 3 (not shown) is adhered to the non-visible side of the front face 2 in order to assemble the in-the-ear hearing device 1. The protruding parts of the front face 2 are cut off after adhesion.

Figure 7B:
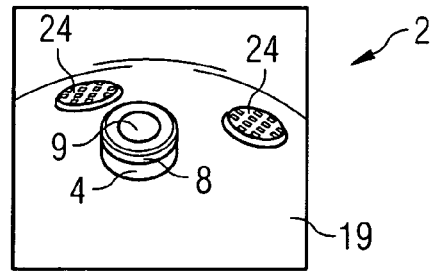
FIG. 7b: shows a detailed view of the contact means from FIG. 7a, FIG. 8: shows an additional front face with contact means.

A detailed exposure of the front surface 19 from FIG. 7a is visible in FIG. 7b. Besides the two microphone openings 24 in the visible surface 19, the extended contact means 4 can be seen. The first contact element 8 is arranged in a ring-shaped fashion on the cylindrical exterior of the contact means. A second contact element 9 is arranged on the tip of the contact means 4. The contact means 4 is embodied in the form of a pushbutton.

Figure 8:
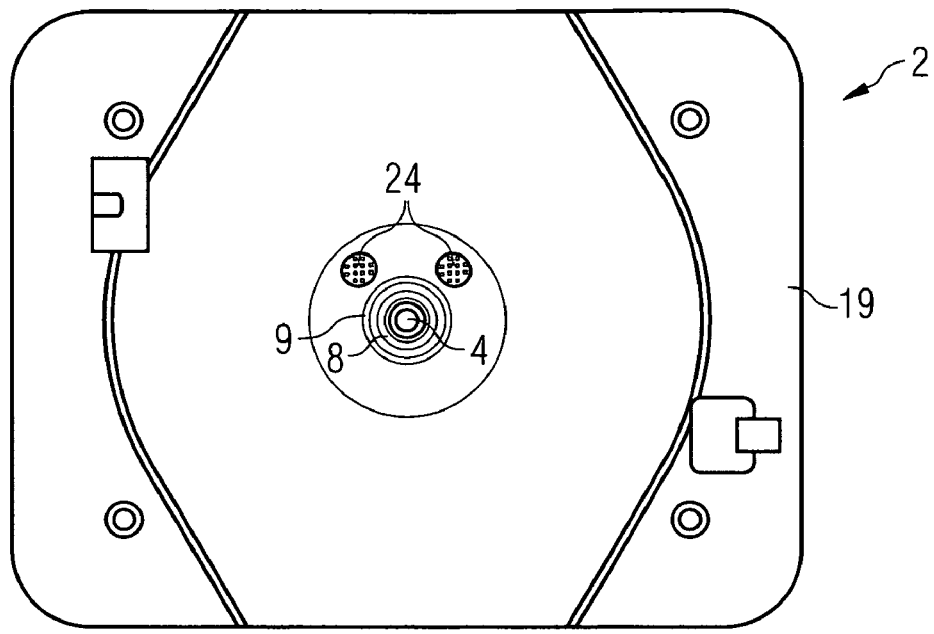

FIG. 8 shows a significantly enlarged additional embodiment of the front face 2 from FIG. 7a. The contact elements 8, 9 are not arranged on the contact means 4 but instead on the visible side 19 of the front face 2. The first contact element 8 and the second contact element 9 are arranged as a concentric circle about the contact means 4. With this embodiment, the contact means 4 is used exclusively to establish a fixed mechanical connection with an external unit 5 (not shown).

Figure 9:
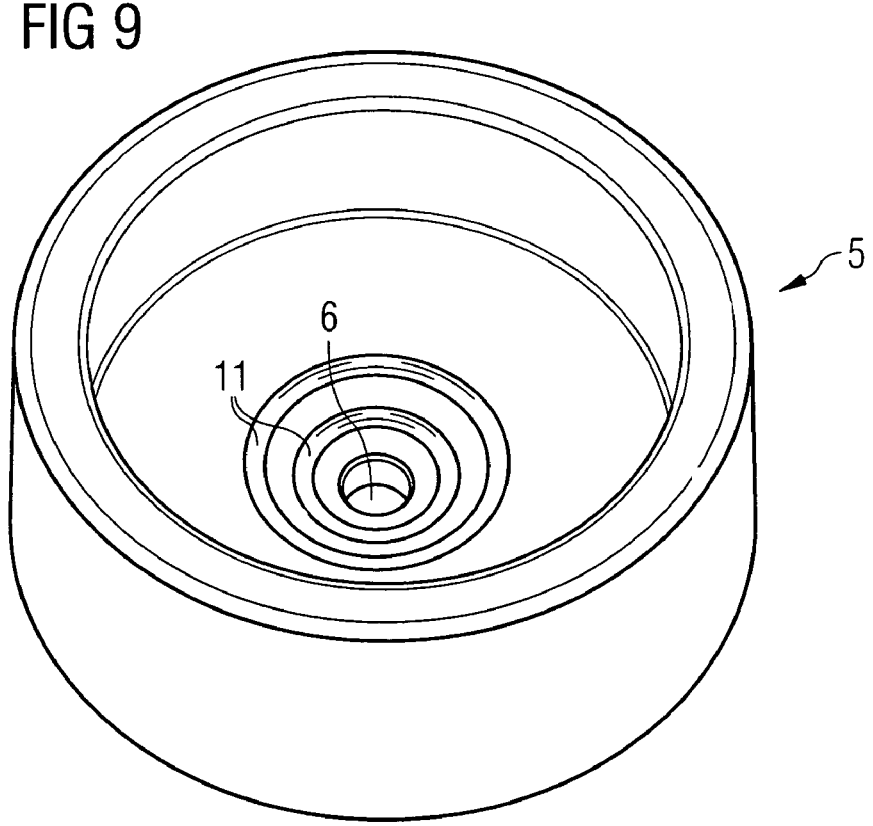
FIG. 9: shows a blind tapped hole of an external unit

FIG. 9 shows a significantly enlarged part of an external unit 5. The opening 6 for inserting the contact means 4 and the two third contact elements 11 for establishing contact with the first and second contact element 8, 9 are apparent from FIG. 8.

FIG. 10 shows a simplified view of part of a section through a battery charging arrangement. An in-the-ear hearing device 1 with front face 2 and a battery 17, which is connected to the contact elements (not shown), is docked onto a receiving apparatus 30 of an external unit 5 with an extended contact means 4, said external unit 5 having a battery charging device 16. To this end, the contact means 4 is inserted into the opening 6 of the retaining device 30. The hearing device 1 is thus mechanically fixed in the external unit 5.

Aside from the described embodiments for arranging the first, second and third contact elements 8, 9, 11, the most varied of possibilities and combinations also exist in terms of arranging contact elements 8, 9, 11. By way of example, the first contact element 8 can be arranged on the tip of the contact means 4 and the corresponding third contact means 11 on the base 12 of the opening 6. Or the first and the second contact means 8, 9 are both attached to the contact element 4 in a ring-shaped fashion with corresponding third contact elements 11 on the interior wall of the opening 6.

The invention claimed is:

1. A hearing device, comprising:
a hearing device housing;
an external unit comprising an electrical battery charging device; and
a contact unit that is flush with the hearing device housing in a withdrawn, non-charging position and contacts the external unit of the hearing device in an extended, charging position,
the contact unit being guided into an opening of the external unit, the opening comprising a third contact element, the third contact element comprising a curved surface, and
the contact unit comprising a first contact element and a second contact element, the first contact element comprising a curved surface for cooperatively connecting with the curved surface of the third contact element when the contact unit is inserted into the opening.

2. The hearing device as claimed in claim 1, wherein the contact unit is inserted into the external unit.

3. The hearing device as claimed in claim 1, wherein the contact unit comprises a first contact element.

4. The hearing device as claimed in claim 1, wherein the contact unit comprises a first contact element and a second contact element.

5. The hearing device as claimed in claim 1, wherein the contact unit comprises a magnetic element.

6. An external unit of a hearing device, comprising:
an opening that inserts a contact unit of the hearing device, the contact unit is guided into the opening by a lateral limitation of the opening during the insertion of the contact unit of the hearing device, the opening comprising a third contact element, the third contact element comprising a curved surface;
the contact unit comprising a first contact element and a second contact element, the first contact element comprising a curved surface for cooperatively connecting with the curved surface of the third contact element when the contact unit is inserted into the opening,
wherein the external unit comprises an electrical battery charging device.

7. The external unit as claimed in claim 6, wherein the third contact element actively connects with the first or the second contact element.

8. The external unit as claimed in claim 7, wherein the third contact element comprises a first spring element for elastically storing the contact element in the opening.

9. The external unit as claimed in claim 6, wherein the contact unit comprises a first magnetic element.

10. The external unit as claimed in claim 9, wherein a second magnetic element is arranged on a base of the opening and actively connects with the first magnetic element.

11. The external unit as claimed in claim 10, wherein the second magnetic element comprises a second spring element for elastically storing the second magnetic element in the opening.

12. The external unit as claimed in claim 6, wherein the opening comprises a tapped blind hole.

13. A hearing device, comprising:
a hearing device housing;
a contact unit that is flush with the hearing device housing in a withdrawn, non-charging position and extends from the hearing device housing for insertion into an opening in an external battery charging device of the hearing device when in an extended, charging position, the contact unit comprising a first contact element, the first contact element comprising a first curved surface;
a third contact element arranged within the opening of the external battery charging device, the third contact element providing a lateral limitation of the opening during insertion of the contact unit, the third contact element comprising a second curved surface for cooperating with the curved surface of the first contact element to provide a mechanical interlock there between when the contact unit is in the extended, charging position within the opening of the external battery charging device.

14. The hearing device of claim 13, wherein the third contact element comprises a first spring element for elastically urging the first and second curved surfaces together to engage the mechanical interlock and for allowed first and second curved surfaces to part for removal of the contact unit from the opening.

15. The hearing device of claim 13, wherein two or more opposed third contact elements are circumferentially spaced within the opening of the external battery charging device.

16. The hearing device of claim 13, wherein the contact unit contacts the external battery charging device in a folded-out position when the contact unit is in the extended, charging position.

17. The hearing device of claim 13, wherein the contact unit comprises a first magnetic element, and wherein the opening of the battery charging device comprises a second magnetic element configured to actively connect with the first magnetic element of the contact unit when the contact unit is inserted into the opening.

18. The hearing device of claim 17, wherein the second magnetic element comprises a second spring element for elastically storing the second spring element in the opening.

* * * * *